(12) United States Patent
Erdogan

(10) Patent No.: US 6,411,755 B1
(45) Date of Patent: Jun. 25, 2002

(54) CLADDING-ASSISTED SINGLE-MODE FIBER COUPLER

(75) Inventor: Turan Erdogan, Spencerport, NY (US)

(73) Assignee: University of Rochester, Rochester, NY (US)

( * ) Notice: Subject to any disclaimer, the term of this patent is extended or adjusted under 35 U.S.C. 154(b) by 0 days.

(21) Appl. No.: 09/559,998

(22) Filed: Apr. 27, 2000

(51) Int. Cl.⁷ .................................................. G02B 6/34
(52) U.S. Cl. .......................................... 385/28; 385/37
(58) Field of Search ............................ 385/15, 27–31, 385/33, 37–39, 49, 50, 123, 124

(56) References Cited

U.S. PATENT DOCUMENTS

| | | | |
|---|---|---|---|
| 4,737,004 A | 4/1988 | Amitay et al. | 350/96.15 |
| 4,763,976 A | 8/1988 | Nolan et al. | 350/96.15 |
| 5,016,967 A | 5/1991 | Meltz et al. | 350/96.19 |
| 5,042,897 A | 8/1991 | Meltz et al. | 385/37 |
| 5,187,760 A | 2/1993 | Huber | 385/37 |
| 6,021,240 A * | 2/2000 | Murphy et al. | 385/37 |
| 6,058,226 A * | 5/2000 | Starodubov | 385/12 |
| 6,104,851 A | 8/2000 | Mahgerefteh | 385/37 |
| 6,282,338 B1 * | 8/2001 | Egalon | 385/28 |

OTHER PUBLICATIONS

Huang et al., "Holographic Bragg grating input–output couplers for polymer waveguides at an 850–nm wavelength", Applied Optics, Feb. 20, 1997, vol. 36, No. 6, pp. 1198–1203.*

Erdogan et al., "Direct single–mode fiber to free space coupling assisted by a cladding mode", OFC/IOOC '99, Technical Digest, Feb. 21–26 1999, vol. 4, pp. 171–173.*

(List continued on next page.)

Primary Examiner—Akm E. Ullah
Assistant Examiner—Michelle R. Connelly-Cushwa
(74) Attorney, Agent, or Firm—Eugene Stephens & Associates; Thomas B. Ryan

(57) ABSTRACT

A single-mode fiber includes a grating located near a fiber tip to shift transmitted light from a fundamental core mode to one or more higher cladding modes. Light exiting the fiber from the cladding mode occupies more area but is more collimated. Translational alignment tolerances are relaxed by the improvement in collimation, allowing couplings to be made directly with the single-mode fiber or through the intermediacy of a conventional lens, which can itself be aligned more readily and be less fast.

21 Claims, 4 Drawing Sheets

OTHER PUBLICATIONS

A.M. Vengsarkar, P.. Lemaire, J.B. Judkins, V. Bhatia, T. Erdogen, and J. Snipe, "Long–period fiber gratings as band–rejection filters", J. Lightwave Tech., vol. 14, pp. 58–65, 1996.

H.M. Presby, N. Amitay, A.F. Benner, P.F. Glodis, "Optical fiber up–tapers with high beam expansion ratios for component fabrication", (Journal Paper), Journal of Lightwave Technology, vol. 7, No. 5, May 1989, pp. 820–823, USA.

H.M. Presby, N. Amitay, R. Scotti, A.F. Benner, "Laser–to–fiber coupling via optical fiber up–tapers", (Journal Paper), Journal of Lightwave Technology, vol. 7, No. 2, Feb. 1989, pp. 274–278, USA.

H.M. Presby, A. Benner, N. Amity, "Research on an expanded beam single–mode fiber–optic connector", (Journal Paper) Applied Optics, vol. 27, No. 15, Aug. 1, 1988, pp. 3121–3123, USA.

N. Amitay, H.M. Presby, F.V. Dimarcello, K.T. Nelson, "Optical fiber tapers–a novel approach to self–aligned beam expansion and single–mode hardware", (Journal Paper) Journal of Lightwave Technology, vol. LT–5, No. 1, Jan. 1987, pp. 70–76, USA.

D. Marcuse, "Mode cornversion in optical fibers with monotonically increasing core radius", (Journal Paper) Journal of Lightwave Technology, vol. LT–5, No. 1, Jan. 1987, pp. 125–133, USA.

N. Amitay, H.M. Presby, "Optical fiber up–tapers with index perturbations–performance analysis", (Journal Paper) Journal of Lightwave Technology, vol. 7, No. 7, Jul. 1989, pp. 1055–1062, USA.

K.P. Jedrzewski, F. Martinez, J.D. Minelly, C.D. Hussby, F.P. Payne, "Tapered–beam expander for single–mode optical–fiber gap devices", Electronic Letters, vol. 22, No. 7, Jan. 16, 1986.

A.M. Vengsarkar, P.J. Lemaire, K.W. Quoi, "Adiabatic mode–field transformers based on photo–induced refractive–index changes in hydrogen–loaded germanosilicate fibers", Paper TuL3, Opt. Fiber Comm. Conf., San Jose, CA, Feb. 20–25, 1994.

N. Amitay, H.H. Presby, "Optical fiber up–tapers for self–aligned beam expansion and single–mode hardware–theory and practice", (Conference Paper), Proceedings of SPIE—the International Society for Optical Engineering, vol. 1038, 1989, pp. 218–221, USA.

T. Erdogan, D. Stegall, A. Heaney, and N. Litchinitser, "Direct single–mode fiber to free space coupling assisted by a cladding mode", Paper FK4, Opt. Fiber Comm. Conf., San Diego, CA, Feb. 21–26, 1999.

"Calculation of Coupling coefficient between Core Mode and Cladding Modes of Fiber Gratings", C.Dengpeng et al., Communications, 1999, APCC/OECC '99, Oct. 1999, vol. 2, pp. 1471–1473.

* cited by examiner

CLADDING-ASSISTED SINGLE-MODE FIBER COUPLER

TECHNICAL FIELD

Light coupled into and out of single-mode fibers generally requires some form of conversion to minimize insertion losses. One such conversion involves collimating light at fiber ends to expand mismatch tolerances, particularly longitudinal mismatch.

BACKGROUND

Telecommunication and sensor systems rely on single-mode optical fibers as favored medium for conveying optical information, particularly over long distances. Coupling light into a single-mode fiber (e.g., connecting the fiber to a source) and coupling light out of a single-mode fiber (e.g., connecting the fiber to a detector) involve well-established technologies. However, such couplings remain expensive and complex because of extremely high tolerances for alignment, cleanliness, and dimensioning of the coupling system.

Mid-link couplings, which interrupt single-mode fibers along their length, support functions such as switching, routing, and signal modification or restoration. More such couplings are needed to accommodate a rising demand on fiber optic systems to perform increasingly complex tasks. The additional couplings add considerable cost and complexity to the fiber systems.

A typical single-mode fiber coupler includes a bulk optical lens, such as a gradient-index (GRIN) lens, fused to one end of a single-mode fiber section. The lens converts light diverging from a core of the fiber end into a more collimated form for further propagation through free space or another optical component. Another lens can be coupled to an end of a second single-mode fiber section for collecting the collimated light and for converging the light onto a core of the second fiber section. Although such lenses contribute to expanding longitudinal and transverse assembly tolerances for connecting single-mode fibers to or from free space and any intervening optics, the lenses themselves must also be aligned, which involves similarly tight tolerances.

Tapered couplers, which can be formed near the ends of single-mode fibers, shift light traveling in a single-mode core (i.e., a core mode of transmission) into the lowest order mode of a multi-mode, expanded-core region so that light exits the fibers substantially more collimated. The larger diameter modes of the expanded-core region are inherently more collimated than the smaller diameter mode of the single-mode core region. The mode shifts are accomplished by adiabatically tapering the core to enable light traveling along the core to remain in the lowest order mode as the core size increases and hence supports multiple modes. Similar couplings can be used to collect collimated light and shift the collimated light from a large-diameter mode in a multiple-mode region to the small-diameter mode of the single-mode core region for further propagation along a single-mode fiber.

Such tapered couplings efficiently convert light between the core mode and the lowest order mode of a multi-mode section, but manufacturing these tapered couplings to required specifications can be difficult. Fiber ends are carefully drawn down at elevated temperatures and cleaved to achieve the required form. The cost of such operations is high, particularly as an incremental cost repeated over many such couplings.

SUMMARY OF INVENTION

Lower cost couplings for single-mode optical fibers with additional performance options can be realized by using grating structures to convert light between core and cladding modes near fiber ends. Here, cladding modes refer to the modes that are guided within the cladding structure that surrounds the core of a standard single-mode fiber. The use of gratings for mode conversion improves coupling possibilities for light entering and exiting the ends of single-mode fibers.

A single-mode optical fiber incorporating an exemplary mode-converting coupler includes a core surrounded by a cladding and an end adapted for coupling the fiber to a continuing optical pathway. A grating formed near the end of the fiber shifts transmissions of light between the core and the cladding so that the light passing through the fiber end is substantially more collimated, thereby expanding both transverse and longitudinal alignment tolerances for coupling the fiber to the continuing optical pathway.

The grating can be formed by a pair of reflective short-period gratings, such as a Bragg gratings, or by a transmissive long-period grating. One of the reflective gratings is written into the core of the single-mode fiber for performing the mode conversion, and the other reflective grating is written into the cladding of the single-mode fiber for redirecting the light toward the fiber end. The transmissive grating performs the same mode conversion without requiring a change in direction. Reflective gratings have the advantage of requiring a minimum of space for reflecting narrow spectral bands, but reverse direction. Transmissive gratings require more space to achieve a similarly specific spectral response but do not reverse direction.

Both types of gratings can be formed directly in the single-mode fibers and subsequent assembly is not required. In addition, manufacture of the gratings can be accomplished without any drawing or furnace operations. Reflective gratings can be written by exposing a photosensitive core or cladding to actinic UV radiation in the form of an interference pattern. Transmissive gratings can be written in a similar fashion, or by using a uniform beam and a periodic shadow (or amplitude) mask, or by successively exposing relatively translated lengths of the fiber. Preferably, both types of gratings are formed near the fiber ends, and perturbations (i.e., grating lines) are written into the fiber at orientations that are substantially normal to the direction of light propagation for minimizing losses of light through sides of the fiber.

The mode-converting couplings can be made to free space; to other fibers or waveguides; or to optical devices such as lasers, detectors, planar or bulk optics, and micro-electro-mechanical systems (MEMS). Grating structure can be used to convert light between the fundamental core mode and one or more higher cladding modes. The mode-converting couplings can also be used as pre-collimators in combination with bulk optical lenses to meet more stringent collimating requirements. Simpler (e.g., less fast) bulk lenses can be used because of the pre-collimating function of the mode-converting couplings.

DRAWINGS

DETAILED DESCRIPTION

Figure 1:
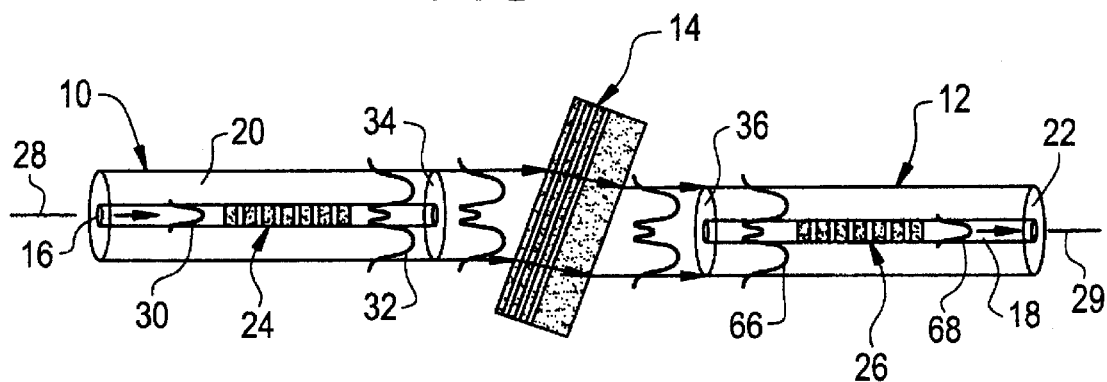
FIG. 1 is a schematic depiction of two single-mode fibers cross-connected through a bulk optical filter.

Exemplary couplings between two single-mode fibers 10 and 12 separated by an expanse of free space containing a bulk filter 14 are depicted in FIG. 1. The fibers 10 and 12 are structured with the conventional features of cores 16 and 18 surrounded by claddings 20 and 22. Within the cores 16 and 18, however, transmissive long-period gratings 24 and 26 are written for shifting light propagating along longitudinal axes 28 and 29 of the fibers 10 and 12 between the cores 16 and 18 and the claddings 20 and 22.

The transmissive grating 24 shifts light traveling primarily in the core 16 as exhibited by a core-mode intensity profile 30 to light traveling primarily in the cladding 20 as exhibited by a larger cladding-mode intensity profile 32. Light emanates from a fiber tip 34 significantly more collimated because of the core 16 to cladding 20 shift. The cladding-mode intensity profile 30 changes little across the expanse of free space containing the bulk filter 14 between the fiber tip 34 of the fiber 10 and a fiber tip 36 of the fiber 12. The two fiber tips 34 and 36 are preferably cleaved, cleaned, and polished to optimize the transmission of light while minimizing back reflections.

Figure 2A:
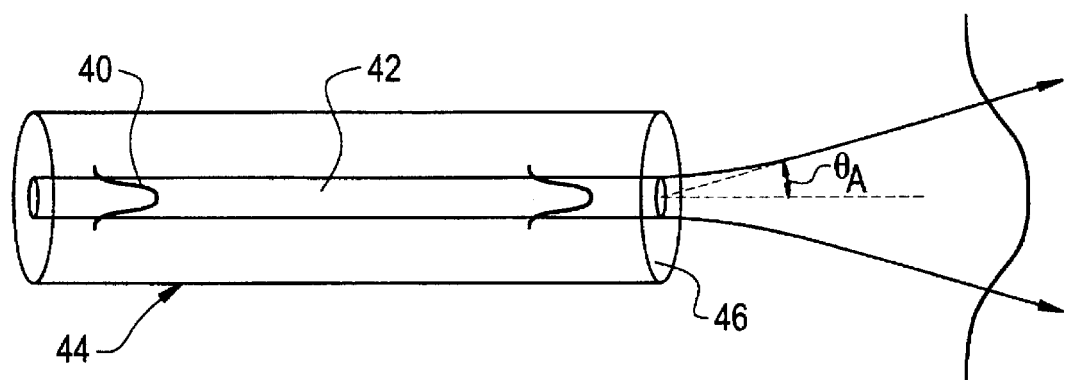
FIG. 2A is a schematic depiction of core-mode divergence from a single-mode fiber.
Figure 2B:
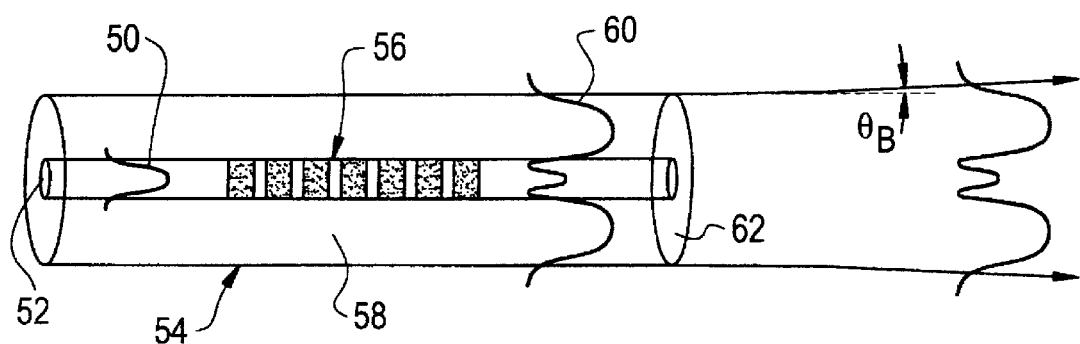
FIG. 2B is a schematic depiction of cladding-mode divergence from a single-mode fiber.

As a further explanation of the collimating benefits of such a core-to-cladding conversion, FIGS. 2A and 2B contrast core-mode divergence with cladding-mode divergence. In FIG. 2A, light having an intensity profile 40 propagates along a core 42 of a single-mode fiber 44 and emanates from a fiber tip 46 at an angle of divergence $\theta_A$. The core-mode intensity profile 40 rapidly expands at the divergence angle $\theta_A$ in a transverse plane as a function of longitudinal displacement.

In FIG. 2B, light having a similar initial intensity profile 50 propagating along a core 52 of a single-mode fiber 54 encounters a transmissive long-period grating 56 that shifts most of the light out of the core 52 into a surrounding cladding 58. Following the Brightness Theorem, which postulates that area can be traded for divergence, a larger cladding-mode intensity profile 60 emanates through a fiber tip 62 at a substantially smaller divergence angle $\theta_B$ (i.e., is substantially more collimated than the core-mode intensity profile 40 emanating from the fiber tip 46). Thus, the cladding-mode intensity profile 60 expands at a much slower rate than the core-mode intensity profile 40 and can be more readily collected for further transmission.

Referring back to the example depicted in FIG. 1, the cladding-mode intensity profile 32 similarly holds form through the free space region that includes the bulk filter 14 and is collected as a nearly identical cladding-mode intensity profile 66 within the cladding 22 of the single-mode fiber 12. The transmissive long-period grating 26 converts the cladding-mode intensity profile 66 to a core-mode intensity profile 68 for further transmission along the single-mode fiber 12.

The cladding-mode transmissions 32 and 66 can be guided by an air-to-cladding interface, but the extent of the cladding-mode transmissions 32 and 66 should be limited to avoid losses of light due to imperfections in the air-to-cladding interface. For this reason, the transmissive long-period gratings 24 and 26 are located adjacent to the fiber tips 34 and 36. Other cladding interfaces, particularly polymers, could be used to guide light over short distances or to influence the intensity profile or spectral content of the light over longer distances.

In addition, the mode conversions preferably take place symmetrically about the longitudinal axes 28 and 29. Care is taken during the manufacture of the transmissive gratings 24 and 26 to orient perturbations in refractive index (i.e., grating lines formed at interfaces between longitudinal regions of different refractive index) substantially normal to the longitudinal axes 28 and 29.

The core-to-cladding directional conversions enlarge transverse areas and correspondingly reduce divergence of beams emanating from single-mode fibers. The cladding-to-core directional conversions collect light beams over enlarged transverse areas of single-mode fiber claddings and converge the collected light within the cores of the same fibers for further transmission. Together, such single-mode fiber-to-fiber couplings relax transverse alignment tolerances approximately in proportion to a ratio of the cladding-mode to core-mode diameters. Longitudinal tolerances are relaxed approximately in proportion to a square of the cladding-mode to core-mode diameters. The angular tolerances are tightened in proportion to the same ratio of diameters, but the loosening of the two translational (i.e., transverse and longitudinal) tolerances are regarded as more significant for purposes of assembly and use.

Figure 3:
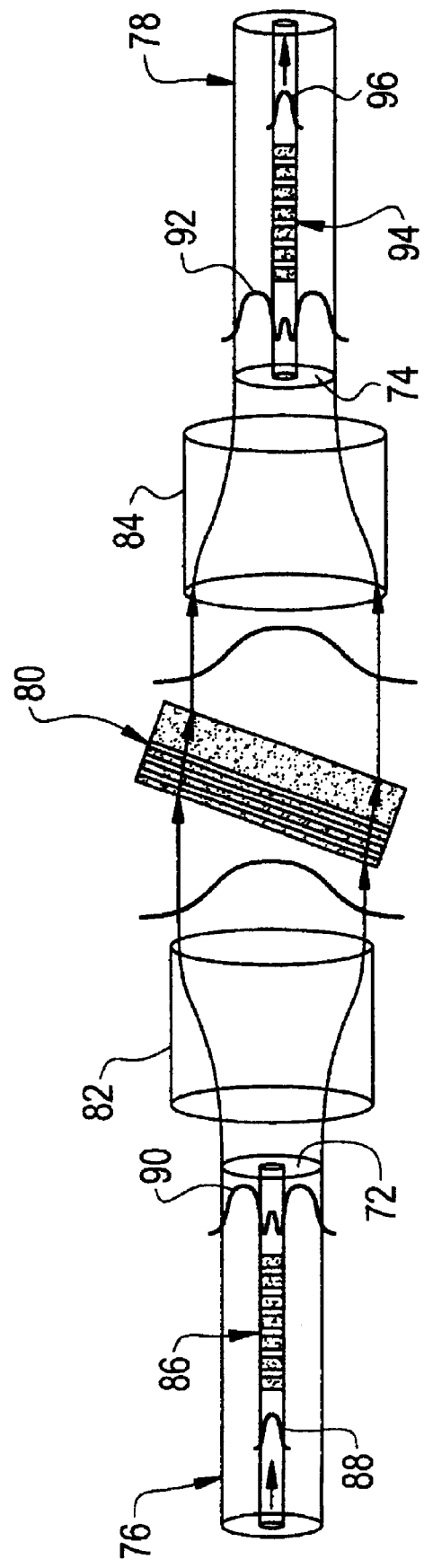
FIG. 3 is a schematic depiction of two single-mode fibers cross-connected through a bulk optical filter straddled by two lenses.

Although the core-to-cladding mode conversions significantly improve the collimation of light emanating from the tips of single-mode fibers, some applications require even more collimated light. The embodiment of FIG. 3 exemplifies this situation. Interposed between tips 72 and 74 of two single-mode fibers 76 and 78 is a bulk filter 80 straddled by two bulk lenses (e.g., gradient index or Fresnel lenses) 82 and 84.

A grating 86 shifts light from a core-mode intensity profile 88 to a cladding-mode intensity profile 90 for pre-collimating light exiting the fiber tip 72. The lens 82, which is preferably fused to the fiber tip 72, completes a remainder of the desired collimation. The pre-collimation provided by the grating 86 allows both the power of the lens 82 to be reduced and the translational alignment tolerances of the lens 82 to be loosened. Fresnel lenses, in particular, can be made simpler if less speed is involved.

The filtered light is collected by the bulk lens 84, which converges the collected light into a cladding-mode intensity profile 92 at the tip 74 of the single-mode fiber 78. A grating 94 converts the cladding-mode intensity profile 92 into a core-mode intensity profile 96 for guiding the light more efficiently over larger distances. Both the power of the lens 84 can be reduced and the translational alignment tolerance of the lens 84 can be loosened with respect to conventional lens-to-fiber couplings.

Figure 4:
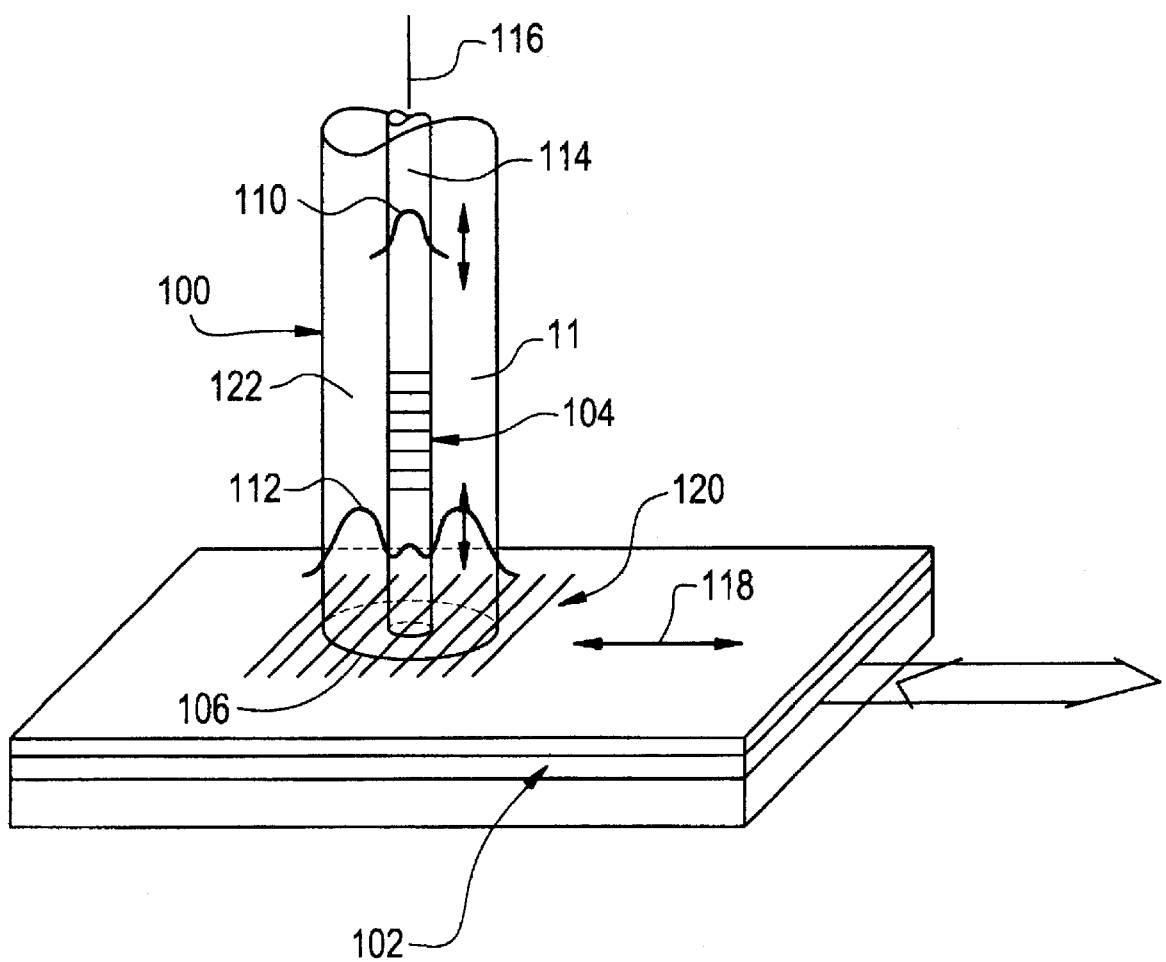
FIG. 4 is a schematic depiction of a single-mode fiber to planar waveguide coupling.

FIG. 4 illustrates an improved coupling between a single-mode fiber 100 and a planar waveguide 102. A grating 104, formed in the single-mode fiber 100 adjacent to a fiber tip 106, shifts light between a core-mode intensity pattern 110 and a cladding-mode intensity pattern 112. The grating 104 is formed in a core 114 of the single-mode fiber 100 along a longitudinal axis 116 that extends normal to a direction of light propagation 118 within the waveguide 102.

A blazed grating 120 within the planar waveguide 102 redirects light emanating from the fiber tip 106 of the single-mode fiber 100 through a right angle into the waveguide 102. Conversely, the grating 120 also redirects light propagating along the waveguide 102 through a right angle into alignment with the longitudinal axis 116 of the single-mode fiber 100. The light emanating from the planar waveguide 102 is collected within a cladding 122 of the single-mode fiber 100. The grating 104 converts the collected light from the cladding-mode intensity pattern 112 to the core-mode intensity pattern 110 for further transmission.

Figure 5:
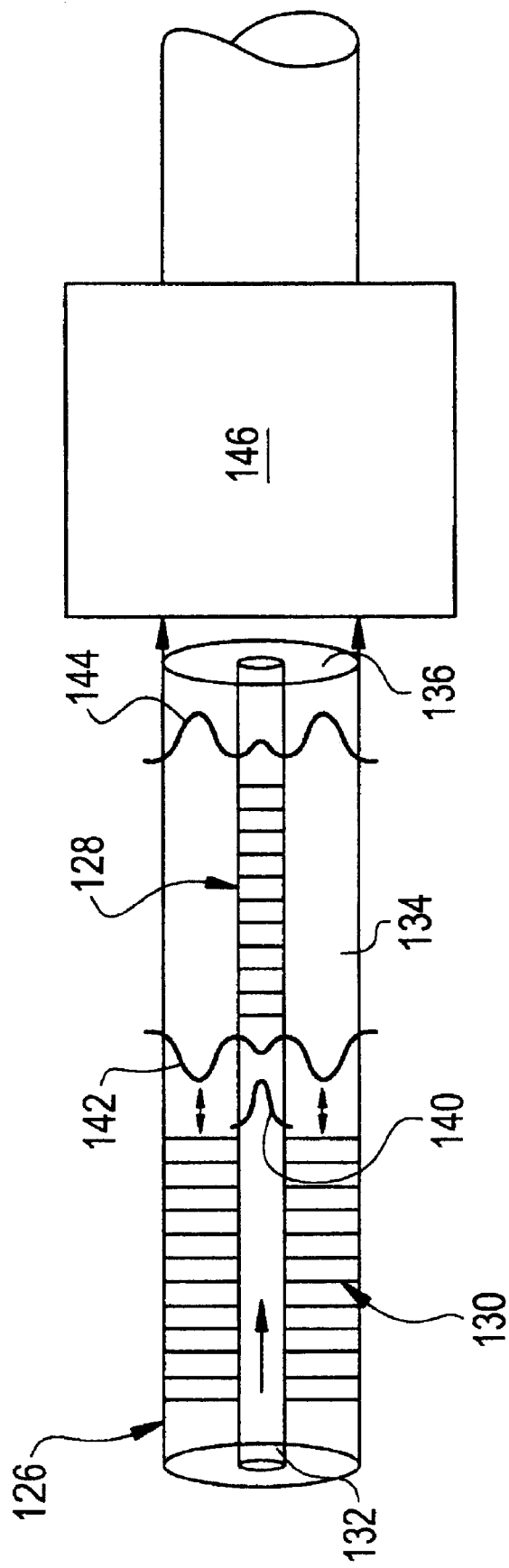
FIG. 5 is a schematic depiction of a single-mode fiber connection to a mid-link optical device using a pair of reflective gratings.

An exemplary mid-link coupling of a single-mode fiber 126 using a pair of reflective short-period gratings 128 and 130 is shown in FIG. 5. The reflective grating 128 is written into a core 132 of the single-mode fiber 126 for reflecting light from the core 132 into a cladding 134 of the fiber 126. The reflective grating 130 is written into the cladding 134 to reflect light in the cladding back toward a fiber tip 136.

Light traveling primarily in the core 132 and having a core-mode intensity profile 140 is largely unaffected by the reflective grating 130 as it passes through the reflective grating 130 en route to the reflective grating 128. However, light converted and reflected by the reflective grating 128 and having a cladding-mode intensity profile 142 is substantially reflected by the reflective grating 130. The reflected light having a cladding-mode intensity profile 144 passes through the reflective grating 128 largely unaffected en route to the fiber tip 136.

The combined affect of the two reflective gratings 128 and 130 is similar to the effect of a single transmissive grating as described in the earlier embodiments. Light passing through the fiber tip 136 is substantially more collimated, which expands translational tolerances for coupling the single-mode fiber 126 to a mid-link device 146, such as a micro-electro-mechanical device as well as to free space or another fiber. A similar combination of reflective gratings could be used in another fiber to reflect light collected in a cladding mode and to both convert and reflect the light again into a core mode for further transmission along the fiber.

The two reflective gratings 128 and 130 can be designed together to exhibit a more specific or complex spectral response. For example, the two gratings can be spectrally offset so that only a portion of the converted light is reflected onward in the cladding mode. The remaining portion of the converted light scatters from the less efficient cladding en route to its source. Couplings between single-mode fibers also produce opportunities for both reflective and transmissive gratings to further influence spectral response. Once a spectrum of light is shifted into the cladding by a first single-mode fiber, a selected portion of the spectrum can be shifted back into the core for further transmission by the second single-mode fiber. Light remaining in the cladding of the second single-mode fiber decays rapidly owing to scattering losses and bends. In addition, the gratings in this or any other of the embodiments can be chirped, concatenated, or otherwise designed according to known practices to exhibit a more complex spectral response for accomplishing filtering functions in addition to coupling.

I claim:

1. An optical coupler for coupling light to or from a single-mode fiber comprising:

a grating formed along a longitudinal axis of the single-mode fiber having a core surrounded by a cladding and a fiber tip adapted for coupling the fiber to a continuing optical pathway;

the grating having periodically spaced perturbations along the longitudinal axis;

the perturbations having a period spacing that shifts light propagating primarily along one of the core and the cladding to light propagating primarily along the other of the core and the cladding;

the grating being positioned adjacent to the fiber tip so that the light passing through the fiber tip propagates primarily along the cladding; and the grating being one of a pair of reflective gratings.

2. The coupler of claim 1 in which a first of the pair of reflective gratings shifts light between the core and the cladding, and a second of the pair of gratings reflects light in the cladding.

3. The coupler of claim 2 in which the first and second reflective gratings exhibit different spectral responses.

4. The coupler of claim 2 in which the first reflective grating is formed substantially in the core of the single-mode fiber, and the second reflective grating is formed substantially in the cladding of the single-mode fiber.

5. The coupler of claim 1 in which the period of the grating is arranged to shift the light between the fundamental core mode and more than one cladding mode.

6. The coupler of claim 5 in which the cladding modes include a lowest order cladding mode and a plurality of higher order cladding modes, and the period of the grating is more particularly arranged to shift the light between the fundamental core mode and more than one of the higher order cladding modes.

7. The coupler of claim 1 in which the cladding is surrounded by polymers located along the longitudinal axis of the fiber between the grating and the fiber tip with properties that are adjusted for guiding the light along the cladding in the vicinity of the fiber tip.

8. A system for reducing translational tolerances of single-mode fiber-to-fiber couplings comprising:

a single-mode fiber having a longitudinal axis, a core extending along the longitudinal axis, and a cladding surrounding the core;

a fiber tip formed at one end of the single-mode fiber;

a grating formed in the single-mode fiber adjacent to the fiber tip;

the grating including periodically spaced perturbations along the longitudinal axis;

the grating perturbations having a period spacing that shifts light between the core and the cladding so that light passing through the fiber tip is more collimated;

the single-mode fiber being a first of a pair of first and second single-mode fibers;

the fiber tip of the first single-mode fiber being positioned adjacent to a fiber tip of the second single-mode fiber; and the second single-mode fiber also including a grating that shifts light between a core and a cladding to improve coupling efficiency between the first and second fibers.

9. The system of claim 8 in which the grating in the first single-mode fiber exhibits a different spectral response than the grating in the second single-mode fiber.

10. A system for reducing translational tolerances of single-mode fiber couplings comprising:

a single-mode fiber having a longitudinal axis, a core extending along the longitudinal axis, and a cladding surrounding the core;

a fiber tip formed at one end of the single-mode fiber;

a grating formed in the single-mode fiber adjacent to the fiber tip;

the grating including periodically spaced perturbations along the longitudinal axis;

the grating perturbations having a period spacing that shifts light between the core and the cladding so that light passing through the fiber tip is more collimated; and the grating being one of a pair of reflective gratings.

11. The system of claim 10 in which a first of the pair of reflective gratings shifts light between the core and the cladding, and a second of the pair of gratings reflects light in the cladding.

12. The system of claim 10 in which the first reflective grating is formed substantially in the core of the single-mode fiber, and the second reflective grating is formed substantially in the cladding of the single-mode fiber.

13. A single-mode optical fiber adapted for transmitting a particular band of wavelengths having a core surrounded by a cladding, a fiber tip adapted for coupling the fiber to a continuing optical pathway, and a grating that shifts transmissions of the wavelength band between a core mode and a cladding mode in the vicinity of the fiber tip so that the band of wavelengths passing through the fiber tip is substantially more collimated to lessen translational alignment tolerances for coupling the fiber tip to the continuing optical pathway, wherein the grating is one of a pair of reflective gratings.

14. The fiber of claim 13 in which a first of the pair of reflective gratings shifts light between the core mode and the cladding mode, and a second of the pair of gratings reflects light in the cladding mode.

15. The fiber of claim 14 in which the first and second reflective gratings exhibit different spectral responses.

16. The fiber of claim 14 in which the first reflective grating is formed substantially in the core of the single-mode fiber, and the second reflective grating is formed substantially in the cladding of the single-mode fiber.

17. The fiber of claim 13 in which the grating shifts the particular band of wavelengths between the fundamental core mode and more than one cladding modes.

18. The fiber of claim 17 in which the cladding modes include a lowest order cladding mode and a plurality of higher order cladding modes, and the grating shifts the light between the fundamental core mode and more than one of the higher order cladding modes.

19. A method of reducing translational tolerances of single-mode fiber-to-fiber couplings comprising the steps of:

arranging a single-mode fiber having a longitudinal axis, a core extending along the longitudinal axis, a cladding surrounding the core, and a fiber tip adapted for coupling the single-mode fiber to a continuing optical pathway;

directing light along the single-mode fiber through a grating located adjacent to the fiber tip and having a succession of periodically spaced perturbations along the longitudinal axis;

spacing the succession of perturbations to shift the light between the core and the cladding so that light passing through the fiber tip is more collimated;

the step of arranging including arranging two single-mode fibers each having a longitudinal axis, a core extending along the longitudinal axis, a cladding surrounding the core, and a fiber tip adapted for coupling the single-mode fiber to a continuing optical pathway;

positioning the fiber tip of a first of the single-mode fibers adjacent to the fiber tip of a second of the single-mode fibers; and the step of directing including directing light through gratings located adjacent to the fiber tips of both single-mode fibers so that light emanating from the fiber tip of the first single-mode fiber is shifted from the core to the cladding of the first single-mode fiber and light collected by the fiber tip of the second single-mode fiber is shifted from the cladding to the core of the second single-mode fiber.

20. A method of reducing translational tolerances of single-mode fiber couplings comprising the steps of:

arranging a single-mode fiber having a longitudinal axis, a core extending along the longitudinal axis, a cladding surrounding the core, and a fiber tip adapted for coupling the single-mode fiber to a continuing optical pathway;

directing light along the single-mode fiber through a grating located adjacent to the fiber tip and having a succession of periodically spaced perturbations along the longitudinal axis;

spacing the succession of perturbations to shift the light between the core and the cladding so that light passing through the fiber tip is more collimated; and the step of directing including directing the light through a pair of reflective gratings located adjacent to the fiber tip.

21. The method of claim 20 in which the step of directing includes reflecting the light with both reflective gratings and shifting the light between the core and cladding with the other of the reflective gratings.

* * * * *